Patented Apr. 2, 1929.

1,707,331

UNITED STATES PATENT OFFICE.

HENRY HERMAN STORCH, OF NEW YORK, N. Y., ASSIGNOR TO THE ROESSLER & HASS-LACHER CHEMICAL COMPANY, OF NEW YORK, N. Y., A CORPORATION OF NEW YORK.

PROCESS AND CATALYST FOR THE SYNTHESIS OF METHANOL.

No Drawing.   Application filed August 2, 1927. Serial No. 210,214.

This invention relates to the synthesis of methanol and specifically has for its object the preparation and use of a catalyst comprising copper and fluorides of the rare earths for the synthesis of methanol from a mixture of hydrogen and carbon-monoxide. In this reaction the gases combine chiefly in accordance with the following equation:

$$2H_2 + CO = CH_3OH$$

More specifically my catalysts comprise copper and fluorides of the cerium family of the rare earths as classified by J. W. Mellor in "A Comprehensive Treatise on Inorganic and Theoretical Chemistry", Vol. 5, page 495. This family comprises a group of elements closely related in physical and chemical properties and which are commonly obtained together in the separation of this group from the rest of the rare earths. This group of elements which I refer to as the cerium family comprises thorium, scandium, lanthanum, cerium, praseodymium, neodymium and samarium. In mentioning any one single element of this group, I intend of course to cover the closely associated mixtures of these elements, since the separation of the group into species is not as sharply defined as usually obtained with other elements, and it is very difficult to obtain any one of the rare earth elements completely separated from the others. In the cases where a specific element is mentioned it forms the major constituent of the fraction used.

The catalysts which are prepared by combination of copper and these rare earth fluorides are active under conditions of low temperatures and pressures. As a rule these catalysts are obtained in hard masses which can easily be granulated and screened to definite size, the granules of which will retain their structure in a suitable manner during use. Powdered portions of this catalyst can also be utilized by compression into pill form; these pills retain their form satisfactorily throughout the reduction to the active stage and during use.

The following examples are given showing methods of preparing these catalysts:

Example I.

Cu+CeF$_3$; 435 parts by weight of cerium nitrate [Ce(NO$_3$)$_3$.6H$_2$O] and 280 parts of copper nitrate [Cu(NO$_3$)$_2$.3H$_2$O] were dissolved in 2000 parts of water. 174 parts of potassium flouride and 179 parts of potassium hydroxide were then dissolved in 2000 parts of water and added to the first solution. This mixture was boiled for about 3 hours after which the precipitate was filtered out of the hot solution. The filter cake was washed until free from nitrates and subsequently dried at 150–200° C. While the copper originally appeared in the wet cake as a hydrated copper oxide the dried material consists of a mixture of cerium fluoride and copper oxide in the proportions of approximately 68% cerium fluoride (CeF$_3$) and 32% cupric oxide (CuO).

The dried precipitate was granulated to 10–30 mesh and subjected to the reaction of reducing gases as described below. After this reducing treatment the composition of the catalyst is substantially 27% metallic copper and 73% cerium fluoride (CeF$_3$).

The reduction can be carried out by passing hydrogen, or mixtures of hydrogen with carbon monoxide or methanol or both over the heated mass. I prefer to reduce with hydrogen saturated at room temperature with methanol. In order to prevent large uncontrollable increases in temperature during reduction it is usually desirable to dilute the reducing gas with nitrogen or other inert gas. For example a satisfactory mixture would be 3 volumes hydrogen, 2 volumes methanol vapor and 95 volumes nitrogen. This reducing mixture is passed at atmospheric pressure over the dried precipitate preferably contained in a copper lined vessel, heated to not over 350° C., preferably to about 150–200° C. The reduction is complete when no further condensation of water is observed upon cooling the off-gases. A rough index of the progress of the reduction may be obtained by plotting the temperature of the catalyst against time. After the maximum temperature has been passed a further reduction period of about an hour generally suffices to complete the reduction.

After reduction the granules were dark copper colored, and of a hard, firm, though brittle structure suited for any methanol synthesis system.

Example II.

Cu+ThF$_4$; 160 parts by weight of copper nitrate [Cu(NO₃)₂.3H₂O] and 45 parts by weight of thorium nitrate

[Th(NO₃)₄.12H₂O]

were dissolved in 1000 parts by weight of water. 40 parts of medium fibred acid-washed asbestos was mixed with this solution after which 25 parts of concentrated hydrofluoric acid was added. Sufficient aqueous ammonia was now added to form copper ammonium nitrate in the solution and to make the solution alkaline. 60 parts of sodium hydroxide in 100 parts of water were now added and the mixture boiled until free of ammonia. The precipitate was then filtered from the hot solution, the filter cake washed until free from nitrates, and then dried at 150–200° C. This dried mass was then granulated and subjected to the action of reducing gases as in Example I to form the catalyst. After the reduction treatment the composition of the catalyst was essentially 41.4% metallic copper, 19.5% thorium flouride (ThF₄), 39.4% asbestos.

*Example III.*

Cu+NdF₃; 200 parts by weight of hydrated neodymium oxide and 240 parts of cupric nitrate were mixed with 2000 parts of water; sufficient nitric acid was now added to dissolve the rare earth oxide. To this solution was added a second solution consisting of 232 parts of potassium fluoride and 112 parts of potassium hydroxide in 1500 parts of water. The mixture was boiled for about 1 hour, filtered on the suction filter; the filter cake was washed free of nitrates and subsequently dried at 150–200° C. The dried mass was then granulated and subjected to the action of reducing gases as above to form the menthanol catalyst. After being subjected to the reduction treatment the composition of this catalyst was about 75% neodymium fluoride (NdF₃) and 25% metallic copper.

In employing these catalysts for methanol synthesis from hydrogen and carbon monoxide it is desirable to uses gases substantially free from the common catalyst poisons which may be present in the raw materials, such as, for example, arsenic, sulphur, phosphorous, volatile iron compounds, or other deleterious constitutents gathered during the gas production.

As an example of use of these catalysts the following data obtained with the catalyst of Example I is given. The granular, reduced catalyst material was packed in a copper lined high pressure steel bomb and the whole heated to about 300° C. A gas mixture, comprising essentially 4 volumes hydrogen and one volume carbon monoxide, and essentially free of catalyst poisons was now passed through the heated catalyst under a pressure of about 200 atmospheres and at a space velocity per hour (S. V. H.) equivalent to about 19,000 cubic feet of gas per cubic foot of catalyst per hour, calculated at normal temperature and pressure. (N. T. P. — 0° C. and 1 atmosphere). During this reaction the temperature of the catalyst mass was about 350° C. A sustained yield of methanol was obtained equivalent to a space time yield (S. T. Y.) of 2700 pounds of methanol per cubic foot of catalyst per 24 hours. The products formed were recovered from the off-gases by cooling while still under pressure. The product was 96–98% methanol. The catalyst retained it granlar form after use in the above manner for extended periods of time.

Under similar conditions with a catalyst temperature of 330° C. and an S. V. H. of 15,000 an S. T. Y. of 1000 was obtained with the catalyst of Example II. At 320° C. and an S. V. H. of 6500, an S. T. Y. of 700 was obtained with the catalyst of Example III.

A suitable method of utilizing these catalysts is to prepare them in the form of pills. For this purpose I prefer to pulverize the dried material before reduction and then compress this powder into small compact masses of desired form, such as, for example, pills. I have obtained excellent results with pills about one-fourth inch in diameter and about one-eighth inch thick. After compression into pills the catalyst is reduced as before and is then ready for use. The pill form of the catalysts gives somewhat higher yields than that obtained with the granular material.

I have found in the course of my experiments with these catalysts that the exact quantities, proportions, etc. given in the preferred examples of catalyst manufacture may be varied, and my catalysts can still be obtained, and I therefore do not wish to be definitely restricted to the examples given. I have found in general that these catalyst materials are valuable with proportions of copper running up to 50% by weight of the finely reduced catalyst mass. If the percent of metallic reduced copper is above this amount, I have found that the catalysts sinter very easily and lose their effectiveness as menthanol catalysts. I therefore, prefer to maintain a percentage of copper below 50% by weight. If the percentage of copper is less than 5 or 10% by weight of the catalyst mass, I have found that the rate of conversion is not satisfactory. I therefore, prefer to have at least 5% and preferably over 10% of the catalyst mass as metallic copper. I have found that in general approximately 25–30% by weight of metallic copper gives the best results.

Nor do I wish to be limited in the utilization of these catalysts to the preferred example of methanol manufacture which I have given by way of illustration. These catalysts are of high activity and hence will operate over a large range of varying conditions, all combinations of which can not be given. I have used these catalysts under many conditions and find that wide limits of pressure and temperature are permissible. All the factors such as, temperature, S. V. H., pressure, etc. may be varied in order to secure various S. T. Y.'s or percent conversions which may be desired because of mechanical and thermal control or for manufacturing economies.

These catalysts have also given good results with gas mixtures where the ratio of hydrogen to carbon monoxide was less as well as greater than that given in my preferred example. My catalysts will form methanol from a gas mixture having any ratio of hydrogen to carbon monoxide, but if the ratio is below one by volume the S. T. Y. will be considerably lower than that obtained with hydrogen in excess by volume. In general I prefer not to use less hydrogen than that required theoretically by the equation $$2H_2 + CO = CH_3OH$$

I have found that a gas containing about four volumes of hydrogen to each volume of carbon monoxide gives the best results, and that with about 6 volumes of hydrogen the S. T. Y. is somewhat lower. For economic reasons I therefore prefer not to exceed 6 volumes of hydrogen for each volume of carbon monoxide, but I do not wish to be limited to this amount since methanol will be formed with the higher hydrogen ratios.

These catalysts are suited for the above syntheses at temperatures ranging between 150° C. and 450° C. although I have found the best results are secured between 300° C. and 400° C. Within the temperature limits given above, methanol will be formed in substantial amounts by these catalysts at pressures of 5 atmospheres and upwards, dependent on the temperature used. Substantial yields of methanol may even be obtained at pressures lower than this; for example, at one atmosphere. Under such conditions, however, the S. T. Y. is in general so much lower that the process would not be economical. In general, I have found that the best results are secured at between 200 and 300 atmospheres, but I do not wish to be limited to this range. The catalysts will form methanol under the pressure and temperature limits given above at any space velocity. Because of economic reasons, however, I prefer space velocities of 2,000 to 20,000, calculated at N. T. P.

I claim:

1. A catalyst for the production of methanol from hydrogen and carbon monoxide which comprises copper and a rare earth metal fluoride.

2. A catalyst for the production of methanol from hydrogen and carbon monoxide which comprises copper and a fluoride of a metal of the cerium family.

3. A catalyst for the production of methanol from hydrogen and carbon monoxide which comprises up to 50% by weight of reduced copper and the balance a fluoride of a metal of the cerium family.

4. A catalyst for the production of methanol from hydrogen and carbon monoxide which comprises copper and cerium fluoride.

5. A catalyst for the production of methanol from hydrogen and carbon monoxide which comprises up to 50% by weight of reduced copper and the balance cerium fluoride.

6. Process for the production of methanol which comprises passing a gaseous mixture of hydrogen and carbon monoxide in contact with a hot catalyst mass comprising copper and a rare earth metal fluoride.

7. Process for the production of methanol which comprises passing a gaseous mixture of hydrogen and carbon monoxide in contact with a hot catalyst mass comprising copper and a fluoride of a metal of the cerium family.

8. Process for the production of methanol which comprises passing a gaseous mixture of hydrogen and carbon monoxide containing an excess of hydrogen in contact with a hot catalyst mass comprising up to 50% by weight of reduced copper and the balance a fluoride of a metal of the cerium family.

9. Process for the production of methanol which comprises passing a gaseous mixture of hydrogen and carbon monoxide, containing an excess of hydrogen, at a pressure of between 5 and 300 atmospheres in contact with a hot catalyst mass comprising copper and a fluoride of a metal of the cerium family.

10. Process for the production of methanol which comprises passing a gaseous mixture of hydrogen and carbon monoxide, containing an excess of hydrogen, at a pressure of between 5 and 300 atmospheres in contact with a hot catalyst mass comprising up to 50% reduced copper and the balance a fluoride of a metal of the cerium family.

11. Process for the production of methanol which comprises passing a gaseous mixture of hydrogen and carbon monoxide, containing an excess of hydrogen, at a pressure above atmospheric in contact with a catalyst mass comprising copper and a fluoride of a metal of the cerium family, said catalyst being maintained at a temperature of between 150° C. and 450° C.

12. Process for the production of methanol which comprises passing a gaseous mixture of hydrogen and carbon monoxide, containing an excess of hydrogen, at a pressure of between 5 and 300 atmospheres in contact with a catalyst mass comprising copper and a fluoride of a metal of the cerium family, said catalyst being maintained at a temperature of between 150° C and 450° C.

13. Process for the production of methanol which comprises passing a gaseous mixture of hydrogen and carbon monoxide, containing an excess of hydrogen, at a pressure of between 5 and 300 atmospheres in contact with a catalyst mass comprising copper and a fluoride of a metal of the cerium family, said catalyst being maintained at a temperature of between 300 and 400° C.

14. Process for the production of methanol which comprises passing a gaseous mixture of essentially four volumes of hydrogen and one volume of carbon monoxide, at a pressure of between 5 and 300 atmospheres, in contact with a catalyst mass comprising up to 50% reduced copper and the balance a metal of the cerium family, said catalyst being maintained at a temperature of between 300 and 400° C.

Signed at Perth Amboy in the county of Middlesex, and State of New Jersey, this 25th day of July, A. D. 1927.

HENRY HERMAN STORCH.